Patented Oct. 21, 1941

2,260,201

UNITED STATES PATENT OFFICE 2,260,201

SYNTHETIC COMPOST FOR MUSHROOM CULTURE

Benjamin B. Stoller, Coatesville, Pa., assignor to Louis F. Lambert, Coatesville, Pa.

No Drawing. Application June 8, 1939,
Serial No. 278,076

8 Claims. (Cl. 71—5)

The invention relates to synthetic compost for mushroom culture.

The object is to provide a compost which is not merely a substitute for horse manure, but which is superior to such manure, because the yield of mushrooms from the synthetic compost is considerably greater, and the hazards of preparing a uniform compost are considerably less.

The invention therefore comprises improved method and means for preparing said compost.

Composts made from fermented horse manure have been, prior to the process described herein, the only ones used commercially for mushroom culture. Since horse manure is becoming scarce in this automobile age, numerous attempts have been made to find substitutes. According to applicant's knowledge, none of these prior attempts have been successful.

Detailed reviews of previous attempts to prepare synthetic composts, have been published recently by E. B. Lambert (Botanical Review 4:397–426, July 1938) and J. W. Sinden (Pa. Agr. Exp. Station Bulletin #365, June 1938). In a review of 166 publication on mushroom culture, E. B. Lambert concludes that "None of the experimental station workers recommends the adoption of artificial manure alone by commercial growers except on an experimental scale", and that as a rule synthetic composts "will yield only ½ to ¾ as much per square foot as beds of horse manure composts. The reason for this has not been satisfactorily worked out and constitutes an intriguing problem . . . No best formula can be given at this time." After a review of previous studies on synthetic composts by other investigators, Sinden concludes that "in no case have the composts reported by these investigators been very satisfactory. All require a long composting period and the yields are so variable as to make their commercial use inadvisable."

While laboratory studies published on the factors affecting mycelial growth have been informative, they have provided no measure or method or formulation of the conditions and requirements for the economical production of sporophores (the fruiting body or mushroom). Formulae and methods remained to be established.

Then again, the requirements of the mycelium are so simple, especially on autoclaved media, that facts obtained by measuring mycelial growth are often misleading from the point of view of sporophore production.

In a great deal of the literature, especially patent literature, there are claims for satisfactory synthetic composts because a good mycelium growth was obtained, whereas actually a good "spawn" growth does not presume a good production of sporophores. In this connection E. B. Lambert, in the reference above cited, states that "There is little known regarding the special nutrient requirements for the development of mushroom sporophores. That such requirements exist seems probable from the fact that beds of artificial composts supporting an excellent "run of spawn" frequently produce only a comparatively few mushrooms. The same material when mixed half and half with composted horse manure may yield normally. Aside from the few papers already cited in connection with the supplementing of manure, this whole problem remained to be investigated."

The method, in accordance with my invention, comprises the determination what nutrient salts and nitrogenous materials are required, their ratio and their formulation for commercial sporophore production, the factors that affect composting, and the method used to aid, supplement and, almost, if not entirely, eliminate the microbial decomposition of the materials employed.

While these formulae and methods have been developed primarily for sporophore production, they may be used also for "spawn" (mushroom mycelial growth) manufacture, after certain modifications have been made which will be described. Though good sporophore production presumes good spawn growth, the contrary does not hold.

After numerous experiments, it has been found that a ton of synthetic compost with a fibrous material containing 65% water, (or containing about 700 lbs. of dry matter) may be made by adding to the fibrous material about 14 lbs. of nitrogen (N), 4 lbs. of phosphoric acid ($P_2O_5$), 12 lbs. potash ($K_2O$), 7 lbs. lime ($Ca(OH)_2$), 75 lbs. lignin; the minor elements consisting of the technical grades of the following chemicals: 2 lbs. manganese sulfate, 1 lb. ferrous sulfate, 4 oz. aluminum sulfate, 4 oz. copper sulfate, 2 oz. zinc sulfate, 1 oz. chromic sulfate, 2 oz. boric acid, ⅝ oz. Potassium bromide, ½ oz. potassium iodide, and adjusting the pH at 7.0 to 8.0, which would ordinarily require the 7 lbs. lime stated.

The quantities of N, $P_2O_5$, and $K_2O$ may be varied as follows: and are herein called total quantities limits

| | Pounds |
|---|---|
| N | 12 to 20 |
| $P_2O_5$ | 3 to 6 |
| $K_2O$ | 9 to 16 |

The N-P-K (nitrogen to phosphoric acid to potassium oxide) ratio should be kept at about 4-1-3, although it allows for some variation, but not beyond the total quantity limits set forth.

These total quantity limits are set for 500 to 700 lbs. of the dry fibrous material which is used as the basic substrate. The average N-P-K content of this fibrous material is included in the total quantity limits, and the variation specified in the total quantity limits allows for the variation in the availability of the N-P-K constituents of the fibrous materials. The additional sources of N-P-K that may be required to be added to the fibrous material to attain the desired ratio and total quantity limits, may cause the total dry matter to be increased to 600 to 900 lbs., depending on how rich or poor these sources are in N-P-K, but the finished compost will average about 700 lbs. dry matter so that at 65% moisture, will be equal to one ton. The exact quantity to be used, depends on the subdivision and absorptive properties of the fibrous materials employed, those that are more finely subdivided and more absorptive will allow larger quantities of N-P-K to be used. Some variation, of course, is naturally inherent for any particular species or variety of the mushroom.

The quantity of lime to add depends on the acidity of the finished compost. It is desirable to obtain a pH of 7.0 to 8.0 in the finished compost. Ordinarily this will require 5 to 15 lbs. of hydrated lime ($Ca(OH)_2$). Magnesium lime may also be used, but it is preferable to have about 50% in it present as calcium lime.

The elements, Mn, Fe, Cr, Al, Cu, Zn, B, Br, and I, the salts and compounds of which shall hereafter be referred to as the "minor elements," give further increases in yield. These minor elements with some fibrous materials have given significant increases in yield of mushrooms. The cations and anions with which these elements are combined are unimportant from the point of view of their nutritive and catalytic functions. However, when the elements Mn, Fe, Al, Cr. Cu, and Zn are also required to function as precipitants of nitrogenous substances and of carbonates, it is preferable to use their soluble salts, the anions, chloride and sulfate having been found satisfactory.

If the fibrous materials contain 50 to 100 lbs. lignin, it is not necessary to add lignin, but depend on the microbial decomposition to liberate the lignin from the fibrous material. The lignin is necessary to precipitate or adsorb the nitrogenous material so that it will be difficult, if not impossible, for most microorganisms, except the mushroom mycelium, to hydrolyze or be able to utilize the nitrogenous material. As will be shown later, lignin set free by chemical agents, or isolated lignin, may be used directly on the nitrogenous material and so greatly reduce, if not eliminate, the lengthy microbial decomposition; and also be more certain that the lignin has been set free to combine with the nitrogenous material. As will be shown later, also many other substances besides lignin may be used. In fact, an extract of tannin has so far given the largest sporophore yield ever recorded.

The procedure, in accordance with the method herein described, used in preparing a synthetic compost is to analyze the materials to be employed into their chemical constituents. First of all the fibrous material is considered. If it has sufficient lignin or similar material, then its N-P-K quantities are determined. Its nitrogen deficiencies, if any, are then corrected by adding a nitrogenous material. It may now have a shortage of $P_2O_5$ or $K_2O$; if it does, then sources of these fractions are now added. The number of nitrogenous, phosphoric acid and potash sources used are immaterial, as long as they add up to the total quantities and ratio desired.

An example of this computation is as follows: If it is desired to prepare a ton of synthetic compost entirely by microbial decomposition, with wheat straw as the fibrous material, and dry brewers grains as the source of N, then since the straw contains sufficient lignin, its N-P-K content is considered and found that in 500 lbs. it has 2.5-0.7-4.0 lbs. respectively. Then, 250 lbs. of dry brewers grains, which contain 10½ lbs. of N and 2.6 lbs. of $P_2O_5$, are added. The 2½ lbs. N of the straw and the 10½ lbs. N of the grain is equal to 13 lbs., so the N is satisfied. Since the $P_2O_5$ adds up to only 3.1 lbs., 7½ lbs. of superphosphate (20% $P_2O_5$) are added and that adds up to 4.8 lbs. $P_2O_5$, which is satisfactory in this case; 12 lbs. of sulfate of potash (50% $K_2O$) are now added, which with the 4 lbs. in the straw, is equal to 10 lbs. By adding the minor elements (2 lbs. $MnSO_4$, 1 lb. $FeSO_4$, 4 oz. $Al_2(SO_4)_3$, 4 oz. $CuSO_4$, 2 oz. $ZnSO_4$, 1 oz. $Cr_2(SO_4)_3$, 2 oz. $H_3BO_3$, ¾ oz. K Br, ½ oz. KI) and adding 9 lbs. lime to bring the pH at 7.0 to 8.0, the formulation is completed. The tabulation of this compost is as follows:

| Material | | N | $P_2O_5$ | $K_2O$ | CaO |
|---|---|---|---|---|---|
| | Pounds | Pounds | Pounds | Pounds | Pounds |
| Dry wheat straw | 500 | 2.5 | 0.7 | 4.0 | 1.0 |
| Dry brewers grains | 250 | 10.5 | 2.6 | | |
| Superphosphate | 7½ | | 1.5 | | 2.0 |
| Sulfate of potash | 12 | | | 6.0 | |
| Hydrated lime | 9 | | | | 7.5 |
| | | 13.0 | 4.8 | 10.0 | 10.5 |

Any fibrous material may be used, such as straw or stover, but fibrous materials which will not decay or undergo extensive microbial decomposition are preferable. Substances which are impregnated or contain large quantities of lignin, or tannin, as in many roots, bark, nuts, and wood, or industrial by-products such as spent licorice roots, and spent myrobalan nuts, spent bark and leaves (material from which tannin has been extracted for industrial use) are especially suitable.

Any nitrogen source may be used. Sources of nitrogen which have been found satisfactory are brewers grains, malt sprouts, fungal tissue of the fermentation industry such as yeast and aspergillus, coca shell and cake from which the theobromine has been extracted, soybean meal, dried blood, tannery sludge, urea, ammonium compounds, calcium cyanamide, and calcium and potassium nitrates.

Any source of potassium and phosphorous compounds may be used. Potassium compounds that have been found satisfactory are the fertilizer grades of potassium chloride and sulfate. Ash of various plant materials may also be used, such as yeast ash, molasses ash, cotton seed hull ash. Also, any source of phosphorous may be used, although superphosphate is the source most available. Commercial sodium hexametaphosphate is not only valuable as a source of $P_2O_5$, but for other purposes as will be shown later. If the potassium or phosphorous materials are insoluble, they may be treated with acids and alkali to bring them into solution. The important feature in using P and K compounds with regard to preparing synthetic composts is to apply them in the formula desired according to their content of $P_2O_5$ and $K_2O$ respectively.

In preparing composts heretofore, only a microbial decomposition was resorted to for the liberation of lignin to precipitate and absorb nitrogenous substances. Although the activity of microorganisms in the compost heap has been recognized, the function of the alkali elements as potassium, sodium, and ammonium has not been duly accredited. The function of these alkali in the solution and dispersion of the lignin after the more easily decomposable carbonaceous matter has disappeared, has been overlooked. The inability to obtain black synthetic composts, like manure composts, was because no potash or soda, or an insignificant quantity of these were added. The potassium salts may be also effective by supplying the microorganisms with an essential element, so that they can utilize the carbonaceous materials more rapidly, and so free the lignin.

While the alkaline salts of potassium and sodium, such as potassium or sodium carbonates are more rapidly effective than their neutral salts such as their chlorides and sulfates, they require considerable precautions in their use, because they are extremely toxic to mycelial growth. The alkaline salts, however are especially useful when the fibrous materials to be used in preparing composts contain a large percentage of cellulose. If, after the potash or soda has dispersed the lignin, the precaution is taken to add the minor elements, as already stated, or in fact any chemical compound which will give an insoluble carbonate, or a strong acid which will destroy the carbonate, and so, at the same time, convert the sodium or potassium carbonate to their neutral salts, these substances will be an effective aid in the microbiological decomposition of the plant material. However, potassium chloride and sulfate have been found highly satisfactory in most cases.

Another method to be used in composting is to allow fibrous materials, which have been adjusted to 65% moisture, to undergo a long period of storage so that the lignins are eventually liberated even with the small quantities of N–P–K which may be present. Or the required quantities of $P_2O_5$ and $K_2O$ are added, or sodium carbonate and potassium carbonate may be added with the precaution already stated, but less than ½ of the required nitrogen is added, and this long storage microbial decomposition is allowed to take place. Of course, the lignin containing materials may be soaked in a solution of about 5 per cent sodium and potassium carbonates to liberate the lignin; but this method is described below. When the fibrous material has become dark brown or black, indicating lignin liberation, a nitrogenous material high in proteins, such as yeast cells or dried blood, and also nitrates, are now added; the desired ratio and the other factors required as already described for the formulation of composts, is now brought to completion. These composts require no further composting but are placed in the mushroom beds and allowed to undergo the thermophilic fermentation as is practiced in the "sweating" stage. This method is more satisfactory with some fibrous materials than with others.

It has also been observed that even a more satisfactory method than waiting for microorganisms to liberate lignins and tannins from the carbonaceous materials with which they are associated, is to extract or free these lignins and tannins by physical and chemical agencies. Lignin may be obtained as an industrial by-product or extracted from such carbonaceous materials as wood, straw, and peat by acids, alkalies, alcohols, phenols, ethyl acetoacetate, pyridine, and other chemicals. Tannins may be extracted simply by heating in water. This method does not limit itself only to the use of the extracts separated from the materials of their manufacture. It is sufficient, also, if the chemical and physical agents are caused to react on the materials from which the lignins and tannins are to be derived so that they exist in a free state and to prepare the composts directly from the extracted material and extracts together. The carbohydrates that may be converted to sugars in the course of these extractions, may be changed to aldehydes, which are also satisfactory as shown below. Thus, chemical agents, in contradistinction to microbiological agents, are used to bring about the free existence of lignins and tannins for the fixation of nitrogenous materials in the preparation of synthetic composts.

The lignins and tannins are combined with the nitrogenous materials into a complex material which is difficult to hydrolyze and be utilized by most microorganisms at the temperature at which the mushroom mycelium is grown. It has also been observed that the mushroom mycelium will grow more rapidly on nitrogenous materials which have been treated with lignin or tannin than untreated material—even under sterile conditions. In fact, urea which is so toxic to the mushroom mycelium in concentration over ½% of the dry substrate even under sterile conditions, is satisfactory when properly treated with tannin or lignin. Ammonium compounds may likewise be made non-toxic by treatment with these substances. Instead of describing the ammonium compounds as treated with lignin, this method may be stated as the ammoniation of the lignin.

Many other substances besides lignin and tannin will combine by precipitation, coagulation or adsorption with nitrogenous substances. Sulfate and chlorides of Cr, Al, and Fe made increasingly basic or heated so that they undergo the process of olification, may be used. Many complex substances formed by olification, condensation, or polymerization are also satisfactory. Molecularly dehydrated phosphates such as a commercial grade of sodium hexametaphosphate, phosphotungstic acid, picric acid, silicic acid, nitric acid, sulfonic acid and the aldehydes may be used. Then again, there are numerous synthetic tannins prepared by the sulfonation of alcohols, phenols, and naphthalene.

In this connection we also wish to mention that it is not necessary in this process to use these substances isolated as pure or technical chemicals. These substances may also be satisfactory for the purpose of making composts even if they are not separated from their source of manufacture. For example, when carbonaceous materials are treated with mineral acids to prepare furfuraldehyde, it is not necessary to separate the latter. Or if nitric acid is allowed to act upon certain proteins, resins or aromatic compounds it is not necessary to separate the picric acid formed. Thus, it is shown that if a chemical substance, which is not in itself similar in the precipitation and adsorption properties like lignin or tannin, but causes the free existence of such agents, as lignin or tannin, then it is actually the same as far as our process is concerned as using the free, isolated agent itself. Furthermore my method is not limited to the enumeration of certain specific chemicals, but is the process whereby chemical agents will precipitate or adsorb nitrogenous substances so that these substances are not easily decomposable or hydrolyzable by most microorganisms, but is especially suitable for the growth of the mushroom mycelium. Or, the process may be defined as the treatment of nitrogenous materials by certain chemical agents, such as lignin, tannin, picric acid, sodium hexametaphosphate, furfuraldehyde, basic chrome sulfate which has undergone olification, and phenolsulfonic and naphthalenesulfonic acids which have undergone condensation so that the nitrogenous substances are more readily and rapidly available to the mushroom mycelium than other biological organisms. This process shall hereafter be referred to as "coprination," and the agents which bring it about as "coprinating agents." Specifically, a coprinating agent may be defined as a complex chemical compound which is generally characterized by having polyhydroxy groups, exists in a state of, or has a tendency to undergo olification, condensation and polymerization, and precipitates or adsorbs nitrogenous substances. The nitrogenous substances suitable for coprination are the proteins, amino acids, urea, ammonium, and cyanamide compounds and substances that contain a high percentage of proteins, such as brewers' grains, soybean meal, dried blood, and yeast cells. This combination by precipitation or adsorption causes the nitrogenous substances to become difficult to hydrolyze or to utilize by most microorganisms or enzymes at the temperature used for the growth of the mushroom mycelium, but serves as an excellent substrate for the growth of the mushroom mycelium.

The formulations, composting methods and coprination process may also be used for the manufacture of spawn (the mycelium grown on a substrate to be used to inoculate beds from which sporophore production is to be obtained). However the total quantities of N-P-K may be sharply reduced; the N and P reduced to $\frac{1}{3}$ to $\frac{1}{2}$ and the K reduced to $\frac{1}{15}$ to $\frac{1}{3}$ of the quantities used in sporophore production. It is also preferable to use higher concentrations of lime and of the minor elements, as indicated in my Patent No. 2,189,303 dated Feb. 6, 1940.

The following examples serve only as illustrations of the numerous formulations and combinations possible by the methods described in this application. Where minor elements are referred to, in the following examples, the quantities are understood to be those given in the early part of this specification.

Example #1

| Material | Quantity | N | $P_2O_5$ | $K_2O$ |
|---|---|---|---|---|
| Spent licorice roots (67.5% moisture) | Pounds 2,000 | Pounds 6.5 | Pounds 1.0 | Pounds |
| Dried brewers grains | 200 | 8.2 | 2.0 | |
| Superphosphate (20% $P_2O_5$) | 5 | | 1.0 | |
| Potassium chloride (50% $K_2O$) | 22 | | | 11.0 |
| | | 14.7 | 4.0 | 11.0 |

The brewers grains, superphosphate, and potassium chloride are thoroughly mixed with the roots and allowed to undergo a microbial decomposition. The compost heap is turned two or three times over a period of 15 to 25 days. A grower skilled in the art knows when the composting is completed. The compost is then filled in beds and allowed to undergo the thermophilic fermentation (at 140° to 150° F.) known as the "sweating stage". The beds are then cooled and inoculated as is well known.

Example #2

| Material | Quantity | N | $P_2O_5$ | $K_2O$ |
|---|---|---|---|---|
| Spent licorice roots (67.5% moisture) | Pounds 2,000 | Pounds 6.5 | Pounds 1.0 | Pounds |
| Dried blood | 60 | 8.0 | 0.5 | |
| Superphosphate (20% $P_2O_5$) | 15 | | 3.0 | |
| Potassium sulfate (50% $K_2O$) | 25 | | | 12.5 |
| Potassium chloride (50% $K_2O$) | 3 | | | 1.5 |
| Hydrated lime | 6 | | | |
| | | 14.5 | 4.5 | 14.0 |

The procedure is the same as for Example #1, except that lime is added, preferably at the last turning. Good results, however, have also been obtained when the lime was diluted with soil and added along with the other materials.

Example #3

| Material | Quantity | N | $P_2O_5$ | $K_2O$ |
|---|---|---|---|---|
| Spent licorice roots (67.5% moisture) | Pounds 2000 | Pounds 6.5 | Pounds 1.0 | Pounds |
| Dried brewers grains | 100 | 4.2 | 1.0 | |
| Urea | 9.2 | 4.2 | | |
| Superphosphate (20% $P_2O_5$) | 12.5 | | 2.5 | |
| Potassium sulfate (50% $K_2O$) | 16 | | | 8.0 |
| Potassium chloride (50% $K_2O$) | 4 | | | 2.0 |
| Dry quebracho tannin extract | 15 | | | |
| Hydrated lime | 6 | | | |
| | | 14.9 | 4.5 | 10.0 |

The procedure is the same as for Example #2. The tannin is, preferably, sprayed on the compost heap during the second turning.

Example #4

| Material | Quantity | N | $P_2O_5$ | $K_2O$ |
|---|---|---|---|---|
| Spent licorice roots (67.5% moisture) | Pounds 2000 | Pounds 6.5 | Pounds 1.0 | Pounds |
| Ammo-phos (16-20-0) | 15 | 2.5 | 3.0 | |
| Calcium cyanamide (20% N) | 20 | 4.0 | | |
| Potassium sulfate (50% $K_2O$) | 20 | | | 10.0 |
| Potassium chloride (50% $K_2O$) | 3 | | | 1.5 |
| | | 13.0 | 4.0 | 11.5 |

The procedure is the same as for Example #1.

Example #5

| Material | Quantity | N | $P_2O_5$ | $K_2O$ |
|---|---|---|---|---|
| Spent myrobalan nuts (65% moisture) | Pounds 2,000 | Pounds 3.5 | Pounds 0.7 | Pounds |
| Dried blood | 60 | 8.0 | 0.5 | |
| Dried brewers grains | 100 | 4.2 | 1.0 | |
| Superphosphate (20% $P_2O_5$) | 12.5 | | 2.5 | |
| Potassium sulfate (50% $K_2O$) | 16 | | | 8.0 |
| Potassium chloride (50% $K_2O$) | 4 | | | 2.0 |
| Hydrated lime | 10 | | | |
| | | 15.7 | 4.7 | 10.0 |

The procedure is the same as Example #2, except that the nuts are, preferably, ground up to the size of wheat grains or thereabouts. The lime and minor elements may be mixed at the start, or sprayed on at the final turning.

*Example #6*

| Material | Quantity | N | $P_2O_5$ | $K_2O$ |
|---|---|---|---|---|
| | Pounds | Pounds | Pounds | Pounds |
| Wheat straw (dry) | 500 | 2.5 | 0.7 | 4.0 |
| Dried blood | 22.5 | 3.0 | | |
| Cottonseed meal | 30 | 2.0 | 0.9 | 0.6 |
| Dried brewers grains | 23 | 1.0 | | |
| Castor bean meal | 36.5 | 2.0 | 0.7 | 0.4 |
| Uramon (urea at 42% N) | 7.2 | 3.0 | | |
| Superphosphate (20% $P_2O_5$) | 12.5 | | 2.5 | |
| Potassium sulfate (50% $K_2O$) | 8.0 | | | 4.0 |
| Potassium chloride (50% $K_2O$) | 2.0 | | | 1.0 |
| Minor elements | | | | |
| Hydrated lime | 10.0 | | | |
| | | 13.5 | 4.8 | 10.0 |

The straw may be all long, or one-half chopped, or all chopped. The straw may be better wetted by spraying with a "wetting" agent such as "Aersol," "Dupontol," "Aresket," sodium hexametaphosphate, and numerous other commercial wetting agents. Or the straw may be dipped in a tank of water containing a wetting agent. After the straw has taken up about 50% water, it is then mixed with the various materials as shown in Example #6. About four turnings over a period of 25 to 30 days are required to compost the straw, but if the straw is all chopped, less time will be required. The hydrated lime and minor elements are, preferably, added at the last turning. If sodium hexametaphosphate is used in place of superphosphate only 3½ lbs. will be required, since it contains 66% $P_2O_5$.

*Example #7*

| Material | Quantity | N | $P_2O_5$ | $K_2O$ |
|---|---|---|---|---|
| | Pounds | Pounds | Pounds | Pounds |
| Spent licorice roots (67.5% moisture) | 2,000 | 6.5 | 1.0 | |
| Calcium nitrate (15% N) | 37 | 5.5 | | |
| Superphosphate (20% $P_2O_5$) | 15 | | 3.0 | |
| Potassium sulfate (50% $K_2O$) | 15 | | | 7.5 |
| Potassium chloride (50% $K_2O$) | 3 | | | 1.5 |
| Minor elements | | | | |
| | | 12.0 | 4.0 | 9.0 |

The roots are allowed to lay in storage several months. After most of the cellulose has disappeared, the roots are thoroughly mixed with a solution of calcium nitrate and the other materials as shown. Without any further composting the roots are placed in the beds and allowed to go through the "sweating stage."

Composts in Examples #8 to 11 inclusive are prepared with coprinating agents. These examples illustrate the employment of four different kinds of nitrogenous materials with two coprinating agents. The coprinating agent is dissolved in sufficient water (preferably hot water) to completely immerse the nitrogenous material to be used, its pH is adjusted at 4.0 to 8.0, but preferably on the acid side; and the nitrogenous material is allowed to soak in it from a few minutes to several days. After sufficient soaking, salts and minor elements and lime are added so that the pH is, preferably, at about 6.5. The solution is then thoroughly mixed with a fibrous material; the compost so prepared is then placed in beds and heated with hot air at 140° F. or allowed to undergo the aerobic thermophilic fermentation of the "sweating" stage. After cooling, the beds are inoculated with spawn as usual.

The coprinating agents may be used in various combinations, and also successions of coprinations may be practiced with different coprinating agents. Various combinations of lignin, tannin, chrome, aldehydes, for example, may be used. Or first, one agent as furfuraldehyde or naphthalene sulfonic acid condensation product may be used, followed by lignin or tannin. The variations of this process of coprination are countless. The aim here is only to describe the process of coprination itself, and illustrate it with a few examples, some of which have resulted in the highest yields ever recorded.

*Example #8*

| Material | Quantity | N | $P_2O_5$ | $K_2O$ |
|---|---|---|---|---|
| | Pounds | Pounds | Pounds | Pounds |
| Spent licorice roots (50% moisture) | 1,300 | 6.5 | 1.0 | |
| Extracted yeast | 90 | 8.0 | 2.0 | |
| Superphosphate (20% $P_2O_5$) | 5 | | 1.0 | |
| Ash from alcohol manufacture (30% $K_2O$) | 35 | | | 10.5 |
| Dry quebracho tannin extract | 35 | | | |
| Minor elements | | | | |
| | | 14.5 | 4.0 | 10.5 |

The tannin is dissolved in about 60 gallons of hot water. The pH of this solution is about 5.0. The yeast is then mixed into the solution. Good results have been obtained both by letting the yeast soak several hours, or over a day, in hot as well as cold solution. After sufficient soaking the superphosphate, potash, minor elements, and lime, if necessary, are added, thoroughly mixed with the yeast-tannin solution and then mixed with the roots to take up all free moisture.

The pH of the solution and the amount of water used should be regulated so that the moisture of the finished compost is about 65% to 70%, and the pH about 7.0 to 8.0. The compost is now placed in the mushroom growing beds and heated with hot air at 140° F. or allowed to undergo the thermophilic fermentation of the "sweating" stage, which lasts 3 to 7 days. The thermophilic organisms which can grow in the presence of the coprinating agents are not detrimental to the ensuing mushroom mycelial growth, but rather aid in the final adjustment of the moisture and pH of the compost. After cooling the beds are inoculated with spawn as usual.

*Example #9*

| Material | Quantity | N | $P_2O_5$ | $K_2O$ |
|---|---|---|---|---|
| | Pounds | Pounds | Pounds | Pounds |
| Spent licorice roots (50% moisture) | 1,300 | 6.5 | 1.0 | |
| Dried brewers grains | 200 | 8.2 | 2.0 | |
| Superphosphate (20% $P_2O_5$) | 5 | | 1.0 | |
| Ash from alcohol manufacture (30% $K_2O$) | 35 | | | 10.5 |
| Calcium lignosulphonate | 50 | | | |
| Minor elements | | | | |
| | | 14.7 | 4.0 | 10.5 |

The procedure is the same as for Example #8 except that the pH of the lignin salt is reduced to about 6.0 with sulfuric or hydrochloric acid. A longer soaking of the grains is preferable.

Example #10

| Material | Quantity | N | P₂O₅ | K₂O |
|---|---|---|---|---|
| | Pounds | Pounds | Pounds | Pounds |
| Spent licorice roots (50% moisture) | 1,300 | 6.5 | 1.0 | |
| Uramon (urea with 42% N) | 20 | 8.4 | | |
| Superphosphate (20% P₂O₅) | 15 | | 3.0 | |
| Ash from alcohol manufacture 30% K₂O) | 35 | | | 10.5 |
| Dry quebracho tannin extract | 40 | | | |
| Minor elements | | | | |
| | | 14.9 | 4.0 | 10.5 |

The procedure is same as for Example #8.

Example #11

| Material | Quantity | N | P₂O₅ | K₂O |
|---|---|---|---|---|
| | Pounds | Pounds | Pounds | Pounds |
| Spent licorice roots (50% moisture) | 1,300 | 6.5 | 1.0 | |
| Dried blood | 60 | 8.0 | 0.5 | |
| Superphosphate (20% P₂O₅) | 15 | | 3.0 | |
| Ash from alcohol manufacture (30% K₂O) | 35 | | | 10.5 |
| Calcium lignosulfonate | 50 | | | |
| Minor elements | | | | |
| | | 14.5 | 4.5 | 10.5 |

The procedure is same as for Example #9.

Summary

The formulations, methods and examples, herein set forth are believed to be a complete disclosure of how to prepare synthetic composts for the commercial production of sporophores. While some of the materials and chemicals used herein have been mentioned in other attempts to produce synthetic composts, yet in contrast to the formulations and methods of reducing these materials and chemicals to uniform composts which will give consistently high yields, other attempts employed them indiscriminately, insufficiently and incompletely, so that inconsistent yields, always less than produced by horse manure composts were obtained. In the most recent publication on the preparation of synthetic composts (Sinden, reference above) urea is selected as a source of nitrogen in preference to such compounds as ammonium phosphate or potassium nitrate because it leaves "no inorganic residue which might interfere with the decomposition process or of the mushroom development later"—thus, entirely disregarding the necessity for regulation of the phosphorous and potassium. This investigator (Sinden) further states that "except for the pH we have yet to find a chemical relation between the substances present in the finished compost which can be regarded as essential to the growth of the mushrooms." Some other investigators, however, have referred to the N-P-K relationship indirectly, but supplied insufficient or excessive quantities, so that their yields have been inconsistent and poor. A method and formula on how to control the N-P-K ratio and total quantities for the commercial production of sporophores had not been developed. The methods and formulae described herein are not merely designed for just growing spawn or mushrooms, but for the commercial production of sporophores, and that means obtaining higher yields than obtained with horse manure composts.

While very small quantities of potash are required for mycelial growth, large quantities as shown in these formulations are required for the commercial production of sporophores. This large quantity of potassium salts is required both for the dispersion of the coprinating agents and for the development of the sporophores, which are high in potassium.

Although the minor elements have been mentioned, more or less in connection with mycelial growth, no method or formula has ever attempted to employ them for the production of sporophores. In their application in the methods herein described, they have been used as precipitants of nitrogenous substance and carbonates and for their nutritive and catalytic functions.

Not only have the factors affecting "composting" been described but methods to regulate it have been developed. By storing fibrous materials containing 65% moisture, or by using chemical and physical agents, so that the lignin or tannin fraction becomes predominating or liberated, composts may be made more rapidly and with the assurance that the desirable changes required for preparing composts for mushroom culture, have occurred. The process of "coprination" is the most efficient method for composting that has been discovered and has also resulted in the highest yields.

In considering the yields, and the practicality of the methods described herein, the yields have been figured as pounds of mushrooms (stubs cut off) picked per square foot of bed surface. While 10% to 35% more bed surface may be obtained with synthetic composts than with manure composts from the same quantity of dry weight of materials, still, the greater cost for materials and the skilled labor required to produce synthetic composts, may to a certain extent or under certain conditions, counterbalance this gain of bed surface. In other words, the cost of production of synthetic composts, in accordance with this invention, may be greater than for manure composts (depending, of course, on the price of manure), even after reckoning on the increased bed surface obtained with the former, and it is only by developing a method which will give a greater yield of mushrooms, that synthetic composts become a practical reality. Whereas manure composts yield 1½ to 2 lbs. of mushrooms per square foot, the synthetic composts prepared by the method in accordance with this invention, yield from 2½ lbs. to as high as 4 lbs. per sq. ft. of bed surface.

What I claim is:

1. In the method of making and using synthetic composts for mushroom culture, the steps which consist in mixing fibrous material and source materials containing N, P₂O₅, and K₂O in the proportions relatively as follows: 12 to 20 lbs. N, 3 to 6 lbs. P₂O₅, 9 to 16 lbs. K₂O and one ton of fibrous material having a moisture content of 65% to 75%, composting 15 to 25 days, then placing in mushroom beds, sweating, cooling and inoculating with mushroom spawn.

2. In the method of making and using a synthetic compost for mushroom culture the steps which consist in adding, source materials containing N, P₂O₅, and K₂O to fibrous material, having a moisture content of 65% to 75%, so that a mixture will be produced in the proportions relatively as follows: 12 to 20 lbs. N, 3 to 6 lbs. P₂O₅, 9 to 16 lbs. K₂O and one ton of said fibrous material, after allowing for the presence of these constituents in the fibrous materials, composting 15 to 25 days then placing in mushroom beds, sweating, cooling and inoculating with mushroom spawn.

3. In the method of making and using a synthetic compost for mushroom culture, the steps which consist in adding, source materials containing N, $P_2O_5$ and $K_2O$ to fibrous material having a moisture content of 65% to 75% so that a mixture will be produced in the proportions relatively as follows: 12 to 20 lbs. N, 3 to 6 lbs. $P_2O_5$, 9 to 16 lbs. $K_2O$, and one ton of said fibrous material, after allowing for the presence of these constituents in the fibrous materials, adding 2 lbs. manganese sulphate, 1 lb. ferrous sulphate, 4 oz. aluminum sulphate, 4 oz. copper sulphate, 2 oz. zinc sulphate, 1 oz. chromic sulphate, 2 oz. boric acid, 3/7 oz. potassium bromide, 1/7 oz. potassium iodide, adjusting the pH at 7.0 to 8.0 composting 15 to 25 days, then placing in mushroom beds, sweating, cooling and inoculating with mushroom spawn.

4. In the method of making and using a synthetic compost for mushroom culture from fibrous materials containing lignin, the steps which consist in adding thereto potassium and sodium compounds for the solution and dispersion of the lignin associated with other constituents in the fibrous materials, then adding nitrogenous and phosphate sources, so that the finished compost will contain, in the proportions relatively as follows, in a ton of fibrous material 12 to 20 lbs N, 3 to 6 lbs. $P_2O_5$, and 9 to 16 lbs. $K_2O$, composting 15 to 25 days, then placing in mushroom beds, sweating, cooling and inoculating with mushroom spawn.

5. In the method of preparing and using a synthetic compost for mushroom culture, the steps which consist in adding sources of $P_2O_5$ and $K_2O$ to plant materials containing 1/2% to 1% N, made up to 65% to 75% moisture, allowing a microbial fermentation of 15 to 25 days to take place, so that lignin becomes the predominating organic plant constituent, and then adding sources of nitrogen high in proteins and also nitrates so that the nitrogen content is increased to 2% to 3% N, then placing the product in mushroom beds, sweating, cooling and inoculating with mushroom spawn.

6. In the method of making and using a synthetic compost for mushroom culture, the steps which consist in mixing fibrous material and source material containing N, $K_2O$, and $P_2O_5$, in the proportions relatively as follows: 12 to 20 lbs. N, 3 to 6 lbs. $P_2O_5$ and 9 to 16 lbs. $K_2O$, and 500 to 700 lbs. of air-dry fibrous material and then adding sufficient water so that the entire mass will have a moisture content of 65% to 75%, and said proportions in one ton of compost, composting 15 to 25 days, then placing in mushroom beds, sweating, cooling and inoculating with mushroom spawn.

7. In the method of making and using a synthetic compost for mushroom culture, the steps which consist in mixing, source materials containing N, which has been soaked for a few minutes to several days, in an acid tannin solution, then adding to this solution source materials containing $P_2O_5$, and $K_2O$, and then adding 2 lbs. manganese sulfate, 1 lb. ferrous sulfate, 4 ozs. aluminum sulfate, 4 ozs. copper sulfate, 2 ozs. zinc sulfate, 1 oz. chromic sulfate, 2 ozs. boric acid, 3/7 oz. potassium bromide, 1/7 oz. potassium iodide, adjusting the pH at 6.5 to 7.0 and then adding to said mixture and thoroughly mixing therewith air-dry fibrous material so that the complete compost will have proportions relatively as follows: 12 to 20 lbs. of N, 3 to 6 lbs. $K_2O$ and 500–700 lbs. of air dry fibrous material, and 65 to 75% moisture per ton, and then placing the compost so prepared in mushroom growing beds to undergo the thermophilic fermentation of the "sweating" stage, and then after cooling, inoculating with mushroom spawn.

8. In the method of making and using a synthetic compost for mushroom culture, the steps which consist in mixing, source materials containing N, which has been soaked for a few minutes to several days, in an acid lignin solution, then adding to this solution source materials containing $P_2O_5$, and $K_2O$, and then adding 2 lbs. manganese sulfate, 1 lb. ferrous sulfate, 4 ozs. aluminum sulfate, 4 ozs. copper sulfate, 2 ozs. zinc sulfate, 1 oz. chromic sulfate, 2 ozs. boric acid, 3/7 oz. potassium bromide, 1/7 oz. potassium iodide, adjusting the pH at 6.5 to 7.0 and then adding to said mixture and thoroughly mixing therewith air-dry fibrous material so that the complete compost will have proportions relatively as follows: 12 to 20 lbs. N, 3 to 6 lbs. $P_2O_5$, 9 to 16 lbs. $K_2O$ and 500 to 700 lbs. of air dry fibrous material and 65 to 75% moisture per ton, and then placing the thermophilic fermentation of the "sweating" stage, and then, after cooling, inoculating with mushroom spawn.

BENJAMIN B. STOLLER.